H. H. CUTLER.
APPARATUS FOR SUPPLYING FLUID PRESSURE.
APPLICATION FILED JAN. 7, 1905.
1,012,821.
Patented Dec. 26, 1911.
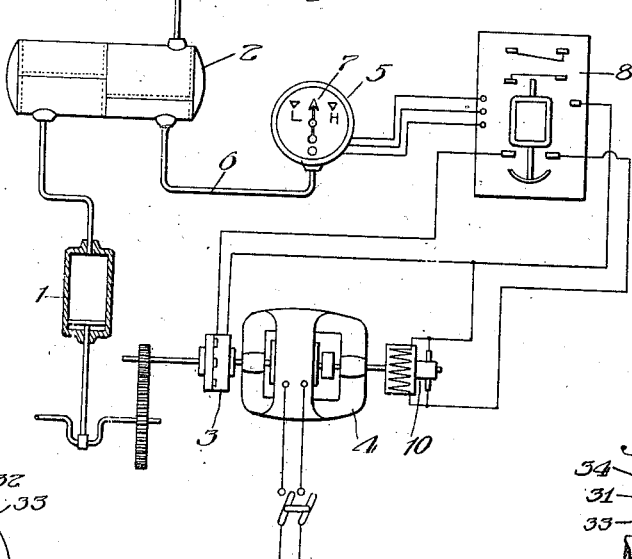
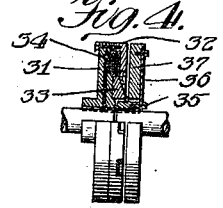
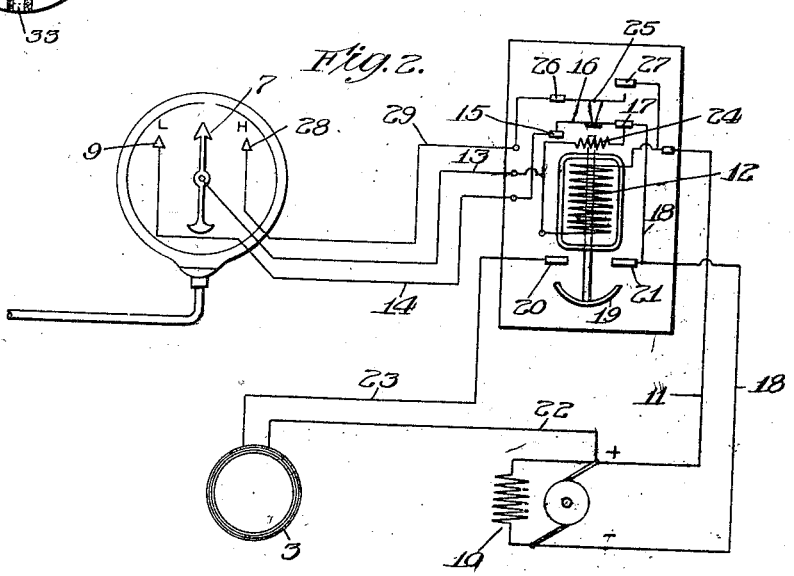
Witnesses:
Inventor:
Henry H. Cutler
By Jones & Addington
Attorneys

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

APPARATUS FOR SUPPLYING FLUID-PRESSURE.

1,012,821. Specification of Letters Patent. Patented Dec. 26, 1911.

Original application filed March 14, 1904, Serial No. 197,961. Divided and this application filed January 7, 1905. Serial No. 240,126.

*To all whom it may concern:*

Be it known that I, HENRY H. CUTLER, a citizen of the United States, residing at Milwaukee, in the county of Milwaukee and State of Wisconsin, have invented new and useful Improvements in Apparatus for Supplying Fluid-Pressure, of which the following is a full, clear, concise, and exact description, reference being had to the accompanying drawing, forming a part of this specification.

My invention relates to, improvements in means for supplying air brakes on cars, or other devices with fluid under pressure, and has for its object to provide an improved means for automatically connecting the pressure generator with the motor when the pressure in the tank falls to a predetermined point, and automatically disconnecting the pressure generator from the motor when the pressure in the tank rises to a predetermined point.

The present application is a division of my prior application filed Mar. 14, 1904, Serial No. 197,961, which has eventuated into Patent No. 786,419 issued April 4, 1905.

I have illustrated one means of accomplishing my object in the accompanying drawings, in which:

Figure 1 is a view showing a motor, the pressure generator and tank; Fig. 2 is a diagrammatic view showing the circuit arrangements for operating the various parts; Fig. 3 is a face view of my clutch; and, Fig. 4 is an enlarged detailed sectional view of the clutch.

In the preferred manner of carrying out my invention, a suitable compressor 1, is provided for compressing air into the tank or reservoir, 2, from which pressure may be supplied for any suitable purpose, as for air brakes or other devices. This compressor 2 is preferably connected to the motor 4, through the medium of a clutch 3, one member thereof being mounted upon the motor shaft, and the other member being connected to the air compressor, in any suitable manner. I have shown this connection in the drawing as being in the form of gear wheels. The motor 4 is also employed for operating a direct current generator 10 which supplies direct current for the clutch 3, and this motor may be a single phase self-starting alternating current motor supplied with current from any suitable source. The operation of the clutch is controlled by means of an electromagnetic switch 8 which in turn is controlled by a pressure regulator 5, said pressure regulator being provided with a Bourdon tube receiving pressure from the tank 2, through a pipe 6, and operating a switch arm for controlling the electrically operated switch.

The form of clutch which I preferably use to connect the motor with the fluid pressure generator is illustrated more particularly in Fig. 3, and is fully set forth in an application filed by me August 5th, 1903, Serial No. 168,388. The magnet or primary member 30 of the clutch has a backing plate 31, upon which is mounted an outer ring having inwardly extending pole pieces 32, and an inner ring having outwardly extending pole pieces 33, these pole pieces are arranged in overlapping positions, and preferably have the spaces between the same filled with non-magnetic material. The energizing winding 34 for the magnet or primary member is placed within an annular channel formed between the backing plate and pole piece. The armature or secondary member 35 has a hub upon which is mounted a spring metal disk 36 which near its center is secured to said hub and at its outer edge supports an armature plate 37, normally separated from the pole pieces of the magnet member. This spring disk serves to withdraw the armature plate from the magnet or primary member when the energizing coil is deënergized. This form of clutch enables the load to be gradually imposed upon the motor when the same is operating at its most effective speed, without subjecting the parts of the apparatus to any undue strain or disturbing the supply circuit, and gradually imposes the load upon the motor by introducing a slip between the motor and the pressure generator.

Normally with the parts in the position illustrated in Fig. 2, a complete circuit extends from the positive side of the generator through the conductor 11, through the solenoid winding 12, resistance 24 and thence by conductor 18 to the negative side of the generator. The resistance 24 also cuts down the strength of the winding 12 to such an extent that the solenoid will not raise its core to close the switch 19. In operation, however, when the pressure in the reservoir decreases, to a predetermined degree, the switch arm 7 of the pressure regulator will engage a contact 9 thereby closing circuit for the current from the positive terminal of the direct current generator 10 through the conductor 11, solenoid 12, of the electrically operated switch 8, conductors 13, switch arm 7, contact 9, conductor 14, terminal 15, bridge 16, terminal 17, conductor 18, to the negative terminal of the generator 10 thereby short circuiting the resistance 24. The solenoid 12 now being fully energized, will attract its core and cause the contact 19 to bridge the terminals 20 and 21. The clutch will now operate to connect the compressor with the motor 4, the circuit of said clutch being closed from the positive terminal of the generator 10, through the conductor 22, the windings of the clutch 3, conductor 23, terminal 20, contact 19, terminal 21, and conductor 18, to the negative terminal of the generator. When the solenoid switch is operated to close the clutch circuit, the plunger raises the contact 16 to break the circuit between the terminals 15 and 17, thereby again placing the resistance 24 in series with the solenoid. With the resistance 24 in circuit, the solenoid 12 will be protected against excessive currents and sparking will be prevented when the contact 7 leaves the contact 9. Upon the opening of the switch contact 16, the switch contact 25 will be caused to bridge the terminals 26 and 27 so that when the contact arm 7 moves into engagement with the contact 28, when the pressure in the reservoir has been increased to a predetermined point, the solenoid 12 will be short circuited. This short circuit is traced from one terminal of the generator 10, through the conductor 11 to terminal 27, across the contact switch 25, to terminal 26, thence by conductor 29, contact 28, contact arm 7, conductor 13, resistance 24, terminal 17, conductor 18, to the opposite terminal of the generator 10. This short circuiting of the solenoid 12 will deënergize the same and the contact 19 carried upon this core will be permitted to drop, opening the circuit between the contacts 20 and 21, and thereby opening the clutch circuit, which deënergizes the clutch, disconnecting the pressure generator from the motor, until the pressure in the reservoir again falls to such a point that the contact arm 7 engages the contact 9, to close the circuit as previously described.

Having thus described my invention what I claim as new and desire to secure by Letters Patent is:

In combination, a compressor, a motor for operating said compressor, an electromagnetic clutch for connecting said motor to said compressor, a generator driven by the motor for supplying current to said clutch, controlling means for said clutch comprising a solenoid having a core and a switch operated by said core to complete the clutch circuit, a maintaining circuit for said solenoid including an economizing resistance, a pressure switch having two operative positions, a switch operated by the core of the solenoid and coöperating with the pressure switch in one position to short circuit said resistance, and another switch operated by said core and coöperating with the pressure switch in its other position to short circuit said solenoid.

In witness whereof, I have hereunto subscribed my name in the presence of two witnesses.

HENRY H. CUTLER.

Witnesses:
J. F. HAWKINS,
WALTER E. SARGENT.